Oct. 17, 1961     J. A. TYLLE     3,004,798

COVER ATTACHMENT FOR WHEELS

Filed July 10, 1958

INVENTOR
JOHN A. TYLLE

BY *Gustave Miller*
ATTORNEY

United States Patent Office 3,004,798
Patented Oct. 17, 1961

1

3,004,798
COVER ATTACHMENT FOR WHEELS
John A. Tylle, Columbus, Nebr., assignor to
Gustave Miller, Washington, D.C.
Filed July 10, 1958, Ser. No. 747,791
1 Claim. (Cl. 301—37)

This invention relates to a cover means for bicycle wheels, and it particularly relates to a removable cover means for aiding the appearance of the bicycle in a decorative manner.

Many youngsters today are interested in so-called "hot-rodding" and "hot-rodding" accessories but are not old enough to indulge their tastes in automotive vehicles. The covers constituting this invention can be constructed to simulate such accessories as well as other decorative devices.

One object of the present invention, is therefore, to provide an attachment for bicycles or the like which is constructed to simulate the appearance of other vehicles.

Another object of the present invention is to provide attachments of the above type which are simple in construction and easy to apply and remove.

Other objects of the present invention are to provide an improved attachment, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which.

Figure 1:
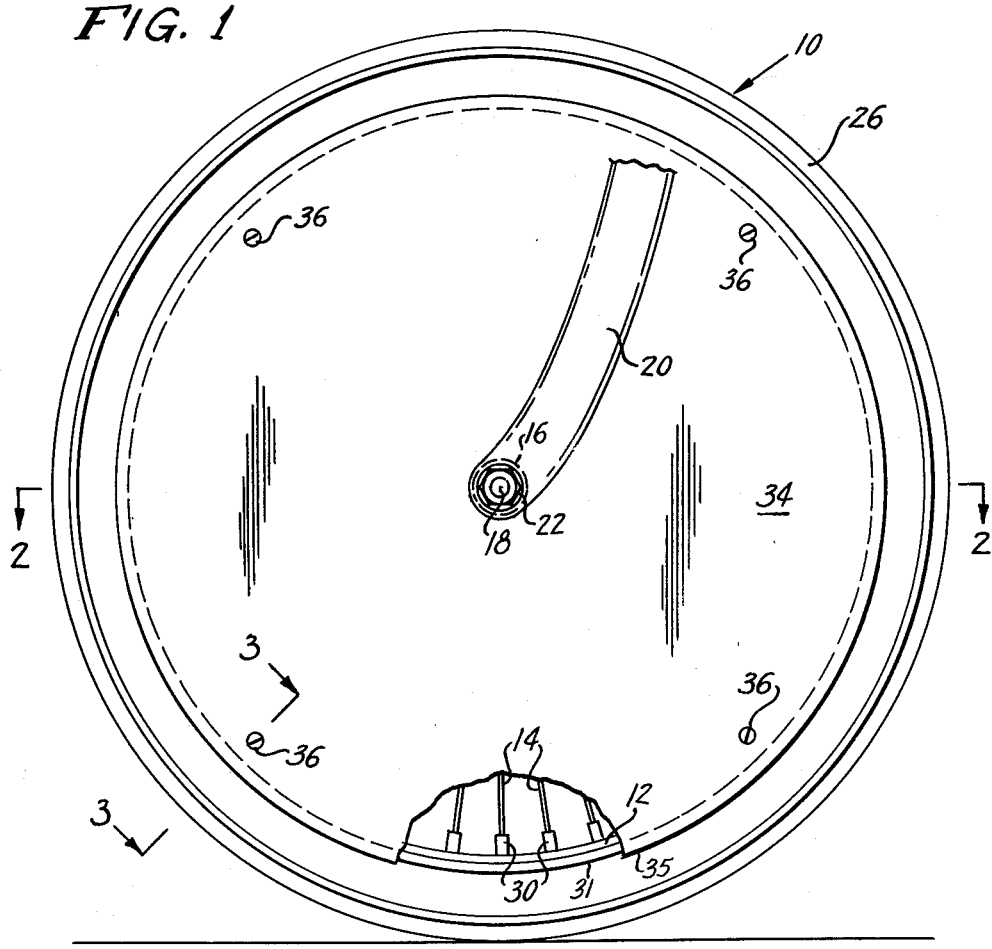
FIG. 1 is a side elevational view, partly broken away, of a wheel having a cover embodying the present invention positioned thereon.

Referring in greater detail to the drawing wherein similar reference characters refer to similar parts, there is shown a bicycle wheel 10 comprising a grooved rim 12 connected by spokes 14 to a hub 16 having bearings therewithin supporting it on the axle 18 on a bicycle frame fork 20 and secured by means of nuts 22 threaded on the reduced, threaded ends 24 of the axle 18. A pneumatic tire 26 is mounted on the grooved rim 12 in the ordinary manner.

Figure 2:
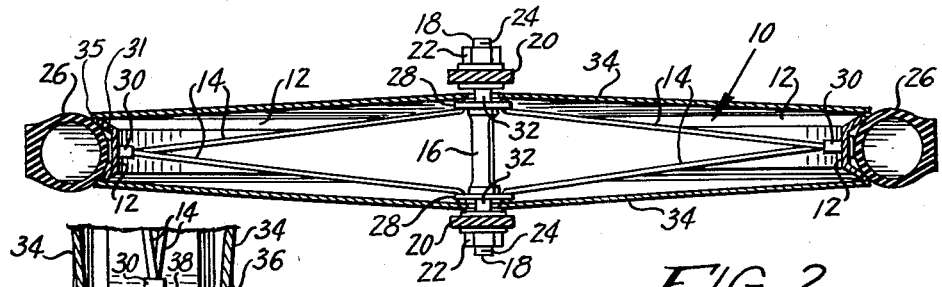
FIG. 2 is a sectional view taken on line 2—2 of FIG. 1.

The hub 16, as shown in FIG. 2, is provided with a flange 28 on opposite ends thereof, these flanges 28 serving as inner connections for the spokes 14, their outer connections being sleeve nuts 30 extending radially inward from the rim 12, the rim 12 having peripherally extending flanges 31 thereon. A reduced portion 32 is provided at each end of the hub 16 between the flange 28 and the adjacent fork member 20.

Removably positioned on each side of the wheel 10 is a disc 34 having central openings to encompass the portions 32 at the ends of the hub 16.

The discs 34 are attached to the wheel 10 by removing the nuts 22, slipping the axle 18 out of the fork 20, inserting the reduced hub portions 32 into the central openings of the discs 34, and then putting it back in the fork replacing the nuts 22. The diameter of the disc 34 is such that when so installed, the circular periphery 35 of each disc 34 abuts against the corresponding peripheral flange 31 of the rim 12.

2

Figure 3:
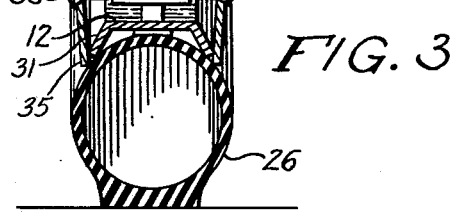
FIG. 3 is a sectional view taken on line 3—3 of FIG. 1.

The discs 34 are provided with a series of holes adjacent their peripheries. When the discs 34 are positioned on the hub portions 32, one on each side of the wheel 10, they are arranged so that their peripheral holes mate with each other. Then a bolt 36 is inserted into the holes on each disc 34 to be threadedly engaged in opposite ends of an internally-threaded sleeve 38 (as shown in FIG. 3).

Since the centrally-apertured portions of the discs 34 are spaced apart by flanges 28, the peripheral connections formed by bolts 36 act to taper the discs 34 radially inward from the central portions thereof (as best shown in FIG. 2); thereby forming a bowl shape which is most attractive to the eye.

The discs 34 are preferably constructed from inexpensive plastic such as a vinyl resin which, although inexpensive, is yet strong enough to hold its shape. These discs 34 are made in various sizes to fit the various standard size bicycle wheels. These discs 34 should also be painted in bright, flashy colors such as gold or silver, or perhaps metallic rose, pale green or the like so that they resemble a "hot-rod" attachment.

There is no need for any air valve opening in the discs 34 since this would only mar the overall streamlined appearance of the device. Instead, the bolts 36 can be loosened, the discs 34 spread apart, and the air valve can then be reached easily.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

A bicycle wheel comprising a hub having an axle extending therethrough, a plurality of spokes radiating from opposite ends of said hub and connected to corresonding opposite sides of a rim having peripherally extending flanges thereon, a tire mounted on said rim within said flanges and bulging outwardly therefrom, and a flat circular disc mounted on each side of said wheel, said discs being centrally apertured to extend about the ends of said axle and abut on the opposite ends of said hub, the circular periphery of each said disc abutting against its corresponding peripheral flange on said rim, and a plurality of oppositely disposed bolts extending inwardly through mating holes in said disc and an internally threaded sleeve for each pair of oppositely disposed bolts having said oppositely disposed bolts threaded therewithin securing said opposite discs in secure relationship to said hub and said rim flanges thereby providing said spoked wheel with the appearance of a true disc wheel.

References Cited in the file of this patent

UNITED STATES PATENTS

| | | |
|---|---|---|
| 1,351,261 | Miller | Aug. 31, 1920 |
| 1,359,647 | Abbott | Nov. 23, 1920 |
| 1,373,889 | Johnston | Apr. 5, 1921 |
| 1,444,807 | Stafford | Feb. 13, 1923 |
| 2,902,316 | Black | Sept. 1, 1959 |

FOREIGN PATENTS

| | | |
|---|---|---|
| 545,150 | Germany | Mar. 12, 1932 |
| 1,021,957 | France | Dec. 10, 1952 |